Oct. 18, 1966  A. E. MEIER  3,279,027
STEREOTYPE PLATE MILLER

Filed Aug. 5, 1965  3 Sheets-Sheet 1

INVENTOR
ALBERT E. MEIER
BY Lockwood, Woodard, Smith & Weikart
Attorneys

INVENTOR
ALBERT E. MEIER

Oct. 18, 1966 A. E. MEIER 3,279,027
STEREOTYPE PLATE MILLER
Filed Aug. 5, 1965 3 Sheets-Sheet 3
Fig. 4.
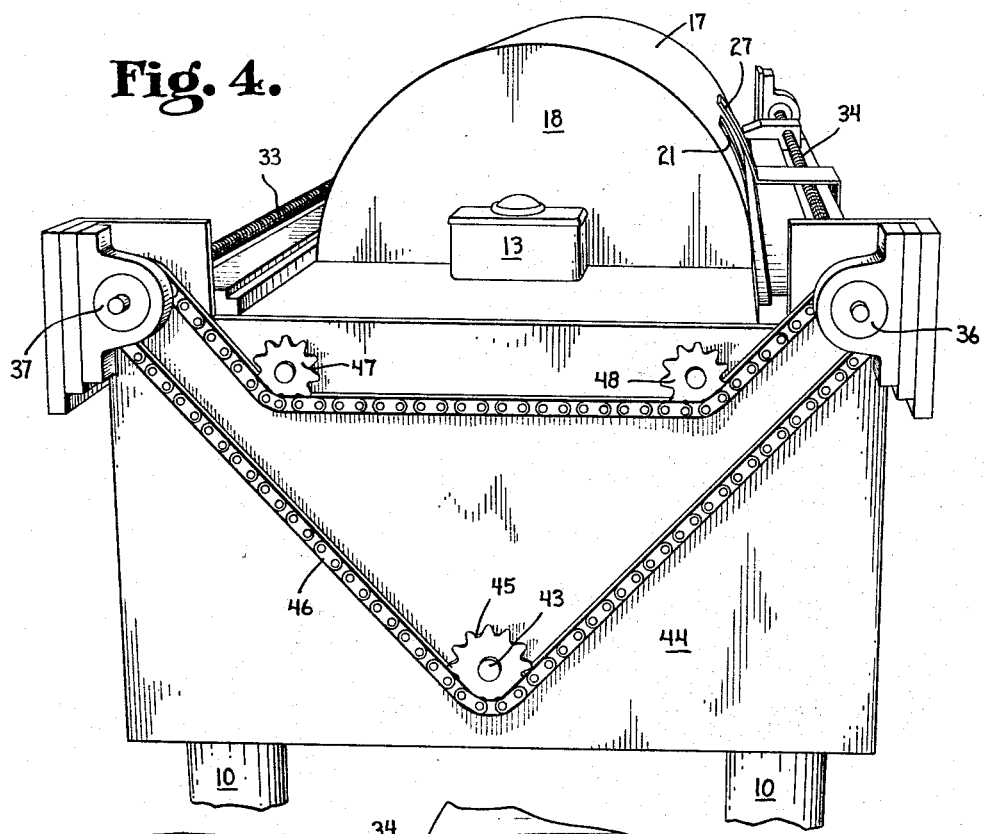
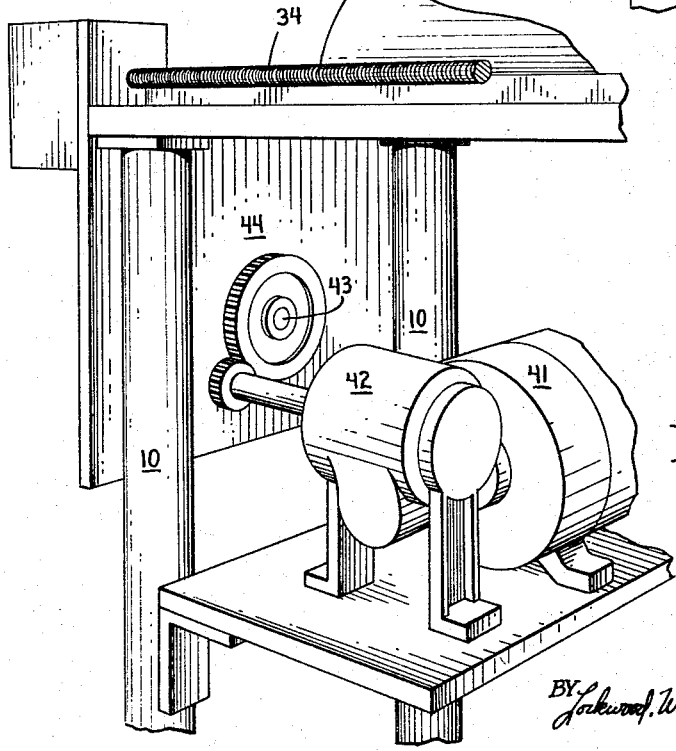
Fig. 5.
INVENTOR
ALBERT E. MEIER
BY Lockwood, Woodard, Smith & Weikart
Attorneys

United States Patent Office 3,279,027
Patented Oct. 18, 1966

3,279,027
STEREOTYPE PLATE MILLER
Albert E. Meier, Muncie, Ind., assignor of one-half to Muncie Newspapers, Inc., Muncie, Ind., a corporation of Indiana
Filed Aug. 5, 1965, Ser. No. 477,489
4 Claims. (Cl. 29—21)

This invention relates generally to processing of stereotype printing plates and in particular to a simplified and dependable apparatus for accurately milling the indentation or pocket in the underside of a curved, stereotype plate required for lock-up or clamping of the plate on the plate lock-up cylinder of a rotary press.

The securing arrangement for attachment of stereotype printing plates to the plate cylinder of conventional rotary presses requires the presence of two, spaced, continuous grooves or pockets on the underside of the plates. The pockets must be of generally triangular cross-sectional configuration and must be cut into the underside of the plates to very close tolerances. The milling of these grooves or pockets must be precise because the accuracy with which the grooves are positioned determines the likelihood of the plate tearing loose from the plate cylinder during a printing run. Additionally, accurate location of the grooves with relation to the image material on the convex face of the plate is necessary to obtain registration of the plates on various cylinders.

The apparatus of the present invention performs the pocket milling function by atuomatically driving the stereotype plate along two guide rails which control the movement of the plate past two independently powered milling cutters which are canted from the vertical somewhat and placed diametrically opposite each other so that, as the plate is moved past the cutters, each mills an accurately formed, continuous groove or pocket in the concave underside of the curved, stereotype plate which is accurately parallel to the rectilinear side margin of the plate.

The primary object of the present invention is to provide an apparatus for accurately milling the underside of curved, stereotype printing plates to provide accurately placed clamping or mounting pockets on the plate.

This and other objects will become apparent as the description proceeds with reference to the accompanying drawings in which:

FIG. 4 is an end view of the apparatus, taken from the end opposite that of FIG. 3, and illustrating the mechanical drive for the printing plate.

FIG. 5 is a perspective view further illustrating the drive providing the printing plate motion.

Figure 1:
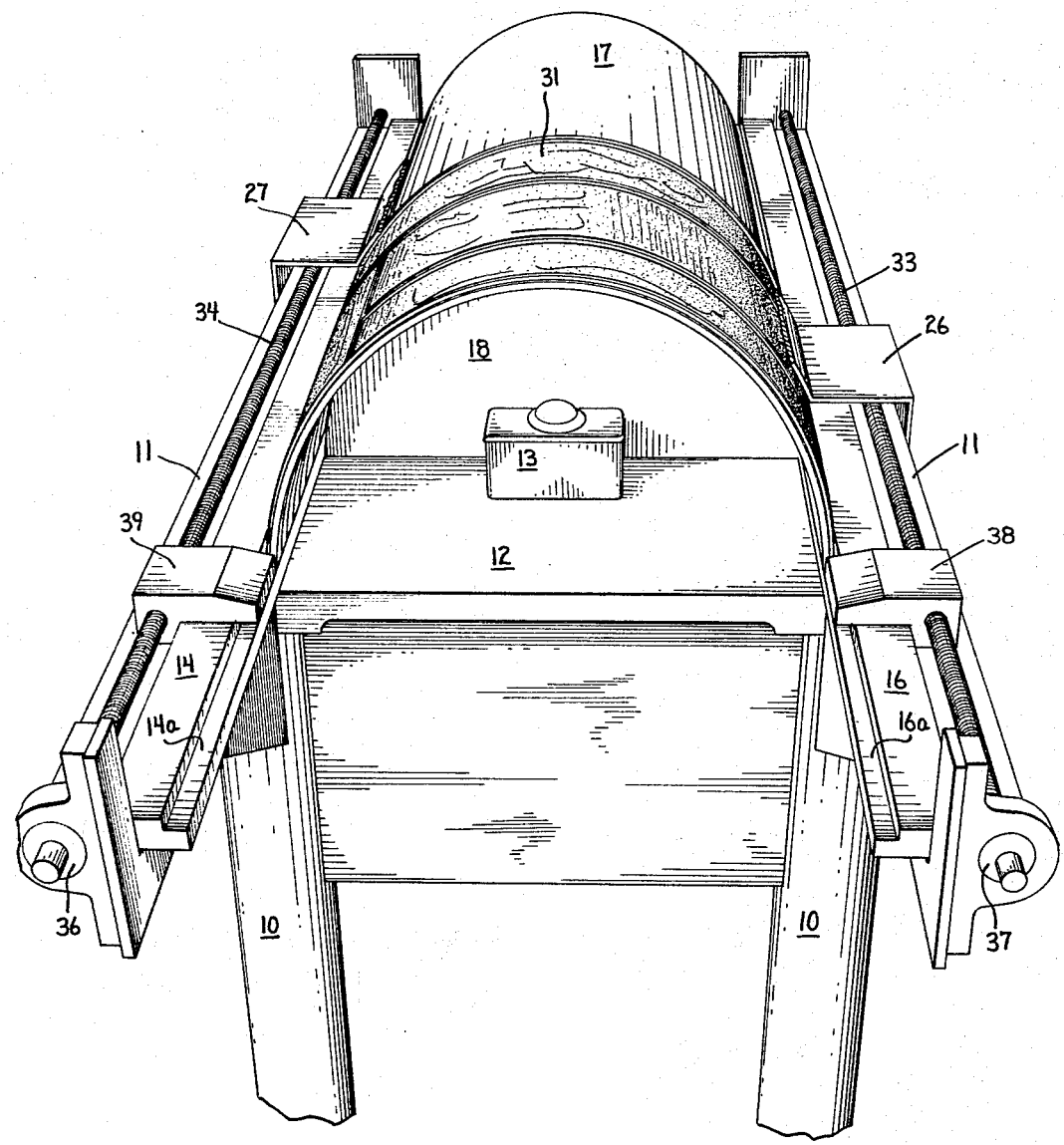
FIG. 1 is a perspective view of an apparatus embodying the present invention.
Figure 2:
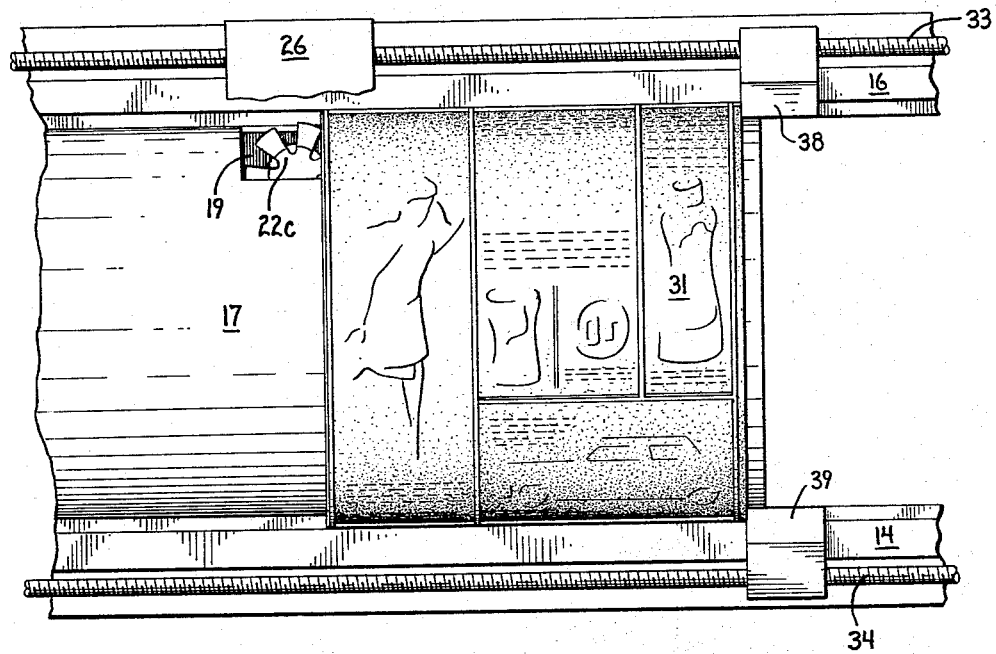
FIG. 2 is a top plan view of a portion of the apparatus shown in FIG. 1.
Figure 3:
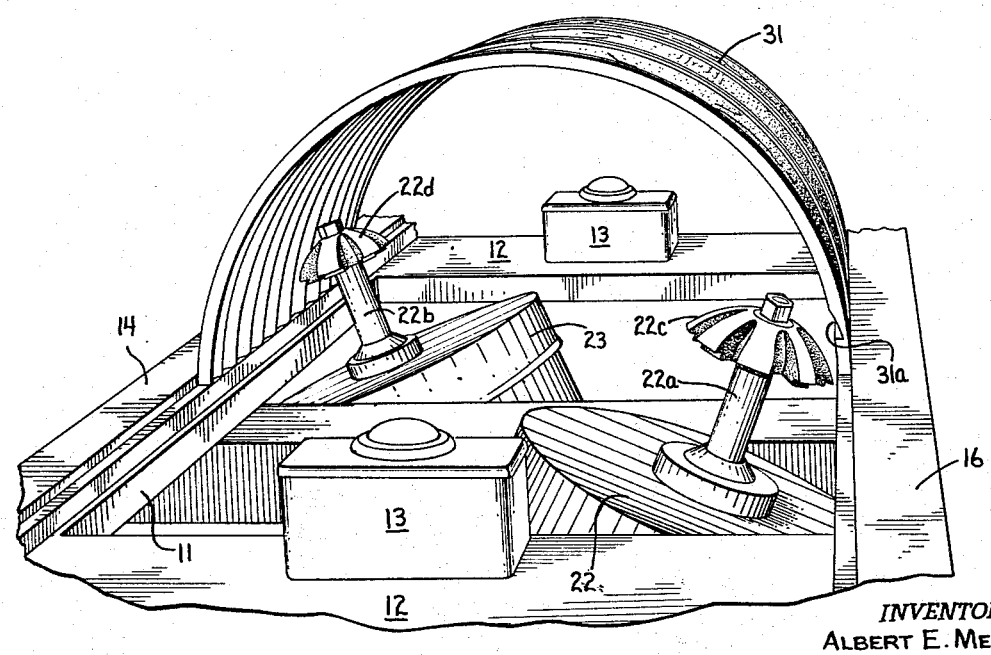
FIG. 3 is a perspective view, omitting certain view-obstructing parts, of the apparatus during an operating cycle.

Referring initially to FIGS. 1, 2 and 3, the apparatus comprises a frame made up of legs 10, longitudinal members 11 and transverse members 12. The transverse members carry conventional pilot lamps 13 for indicating the energized condition of the two drive motors for the milling cutters to be subsequently described.

Secured to the members 11 are parallel, spaced guide rails 14 and 16, the rails extending beyond the transverse member 12 as indicated in FIG. 1. A curved hood 17 bridges the guide rails, the hood having end closure plates 18 (the hood 17 is omitted from FIG. 3 to prevent its obscuring of the view of the cutters and their action on the curved printing plate). The hood 17 is provided with generally rectangular apertures 19 (FIG. 2) and 21 (FIG. 4) adjacent each of the hood side margins.

As may best be seen in FIG. 3 the table supports two electric motors 22 and 23 each of which rotates a spindle 22a and 22b. The spindles carry conventional milling cutters 22c and 22d respectively. The motors rotate the cutters 22c and 22d in opposite directions and the rotational axes of the spindles 22a and 22b extend toward their adjacent guide rails 16 and 14 at an angle to the plane determined by the guide rails. As will be evident from FIGS. 2 and 3 this arrangement places the cutter 22c in registration with the hood aperture 19 and in overlying relation to the inner marginal area of the guide rail 16. The cutter 22d is similarly positioned in registry with the hood aperture 21 (FIG. 4) and in overlying relation to its adjacent guide rail 14.

Extending upwardly from the table, attached to the guard rails, are chip deflector shields 26 and 27, the the shields being shown fragmentarily in FIG. 1 with the configuration of the shield 27 being visible in FIG. 4. The shields overlie, in spaced relation, the hood apertures 21 and 19 and serve to deflect downwardly any chips thrown by the cutters as the plate being milled moves past the cutters. The guide rails 14 and 16 are grooved to provide inset portions 14a and 16a respectively. As will be evident from FIGS. 1 and 3 the inset portions 14a and 16a of the guide rails accommodate the side margins of an arcuate printing plate 31 which overlies the curved hood 17.

The plate 31, in preparation for the milling operation, is placed on the guide rails 14 and 16 in front of the hood 17, as viewed in FIG. 1. A means for moving the plate 31 along the length of the guide rails and into operating relation with the cutters includes the threaded spindles 33 and 34. The threaded spindles are coextensive with and parallel to the guide rails and are journaled in bearings 36 and 37 carried by brackets extending from the longitudinal members making up the frame. Threaded on the rods 33 and 34 are pusher blocks 38 and 39 which extend over the upper surface of the guide rails and engage the end edge of the printing plate 31.

Referring to FIGS. 4 and 5, the drive for the threaded rods 33 and 34 includes a motor 41 (FIG. 5) which through a gear box 42 drives an output shaft 43. As indicated in FIG. 4, the output shaft 43 extends through an end plate 44. The drive shaft 43 rotates a sprocket 45 which drives a chain 46. The chain has driving engagement with sprockets (not visible in FIG. 4) rigidly attached to the rods 33 and 34, the chain also engaging the idler sprockets 47 and 48. The drive for the sprocket 45 is reversible so that, by reversing the drive, at the end of a milling operation the pusher blocks 38 and 39 may be returned to proper starting position on the threaded rods.

In operation the unmilled printing plate is placed on the guide rails at the front end of the table as viewed in FIG. 1 with the pusher blocks close to or in engagement with the end edge of the plate 31. The drive motors 22 and 23 for the milling cutters and the drive motor 41 for the pusher blocks may then be energized. Rotation of the rods 33 and 34 will cause the blocks to move along the rods 33 and 34 pushing the plate 31 along the length of the guide rails. The rails guide the plate between the curved hood 17 and the chip deflector plates 26 and 27 and as the plate passes the apertures 19 and 21 in the hood, through which the cutters extend, a rectilinear groove of triangular cross section is milled in the concave underface of the plate 31. In FIG. 3, with the hood removed, the plate has just passed the cutter 22c, completing the groove 31a, and the groove cut by the cutter 22d (this groove not being visible in FIG. 3) is intermediate in its formation. As will be evident from FIG. 3, when the plate 31 has completed its traverse of the guide rails the groove or pocket 31a and the corresponding groove on the opposite side of the plate will be completely formed and will be accurately parallel to the side margins of the plate. On the completion of the milling operation, the plate may be removed from the apparatus and the pusher blocks 38 and 39 returned to their starting positions on the threaded rods 33 and 34.

The apparatus described is relatively simple and sturdy in construction and because of the opposed inclination of the axes of rotation of the cutting members and the holding action of the guide rails, the clamping grooves required in the concave side of the curved printing plates are accurately positioned. While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An apparatus for milling a continuous rectilinear clamping groove on the concave face of a printing plate of arcuate cross section at a predetermined distance from each of the side margins of the plate, said apparatus comprising a frame, two guide rails rigidly attached to said frame and extending in spaced parallel relation, a curved hood bridging said guide rails and having apertures therein adjacent each side margin, two electric motors supported by said table between said guide rails and adjacent said hood, each of said motors rotating a spindle carrying a milling cutter thereon, said spindles rotating in opposite directions and each extending toward one of said guide rails and inclined with relation to the plane determined by the guide rails to place each of said cutters in registration with said hood apertures and in overlying spaced relation with respect to its adjacent guide rail, and chip deflector shields extending from said table into spaced overlying relation with each of said hood apertures, said guide rails being adapted to accommodate the side margins of an arcuate printing plate and to guide the plate between said hood and said chip deflector shields as the plate is moved along the length of said guide rails, said cutters forming a clamping groove in the concave face of the plate during traversal of the guide rails by the plate.

2. An apparatus as claimed in claim 1 having drive means for moving said plate along said guide rails, said drive means comprising a threaded rod disposed parallel to and adjacent each of said guide rails, pusher elements threaded on said rods and adapted to engage said plate, and means for rotating said rods to cause said elements to move therealong carrying said plate along the guide rails.

3. An apparatus for milling a continuous rectilinear clamping groove on the concave face of a printing plate of arcuate cross section at a predetermined distance from each of the side margins of the plate, said apparatus comprising a frame, two guide rails rigidly attached to said frame and extending in spaced parallel relation, two electric motors supported by said table between said guide rails and adjacent said rails, each of said motors rotating a spindle carrying a milling cutter thereon, said spindles rotating in opposite directions and each extending toward one of said guide rails and inclined with relation to the plane determined by the guide rails to place each of said cutters in overlying spaced relation with respect to its adjacent guide rail, said guide rails being adapted to accommodate the side margins of an arcuate printing plate and to guide the plate as the plate is moved along the length of said guide rails, said cutters forming a clamping groove in the concave face of the plate during traversal of the guide rails by the plate.

4. An apparatus as claimed in claim 3 having drive means for moving said plate along said guide rails, said drive means comprising a threaded rod disposed parallel to and adjacent each of said guide rails, pusher elements threaded on said rods and adapted to engage said plate, and means for rotating said rods to cause said elements to move therealong carrying said plate along the guide rails.

No references cited.

RICHARD H. EANES, JR., *Primary Examiner.*